United States Patent
Tanbakuchi

(10) Patent No.: US 7,477,781 B1
(45) Date of Patent: Jan. 13, 2009

(54) METHOD AND APPARATUS FOR ADAPTIVE PIXEL CORRECTION OF MULTI-COLOR MATRIX

(75) Inventor: Anthony Amir Tanbakuchi, Del Mar, CA (US)

(73) Assignee: DALSA Corporation, Waterloo (CA)

( * ) Notice: Subject to any disclaimer, the term of this patent is extended or adjusted under 35 U.S.C. 154(b) by 1409 days.

(21) Appl. No.: 10/658,523

(22) Filed: Sep. 10, 2003

Related U.S. Application Data

(60) Provisional application No. 60/417,142, filed on Oct. 10, 2002, provisional application No. 60/417,152, filed on Oct. 10, 2002.

(51) Int. Cl.
*G06K 9/00* (2006.01)
*G06K 9/56* (2006.01)
*G06K 9/32* (2006.01)

(52) U.S. Cl. .................................. 382/167; 382/205

(58) Field of Classification Search ............. 382/154, 382/162, 164, 167, 181, 205, 254, 261, 272, 382/285, 300; 358/515, 518, 523, 525, 530
See application file for complete search history.

(56) References Cited

U.S. PATENT DOCUMENTS

| | | | | |
|---|---|---|---|---|
| 5,291,293 A | 3/1994 | Kapan | | 348/246 |
| 5,596,367 A | 1/1997 | Hamilton, Jr. et al. | | 348/272 |
| 5,631,703 A | 5/1997 | Hamilton, Jr. et al. | | 348/273 |
| 5,748,803 A | 5/1998 | Schielke | | 382/275 |
| 5,805,217 A | 9/1998 | Lu et al. | | 348/273 |
| 5,881,182 A | 3/1999 | Fiete et al. | | 382/275 |
| 5,990,950 A | 11/1999 | Addison | | 348/273 |
| 6,091,851 A | 7/2000 | Acharya | | 382/167 |
| 6,229,578 B1 | 5/2001 | Acharya et al. | | 348/607 |
| 6,236,433 B1 | 5/2001 | Acharya et al. | | 348/273 |
| 6,330,029 B1 | 12/2001 | Hamilton et al. | | 348/272 |
| 6,392,699 B1 | 5/2002 | Acharya | | 348/273 |
| 6,697,534 B1 * | 2/2004 | Tan et al. | | 382/261 |
| 6,823,086 B1 * | 11/2004 | Dolazza | | 382/261 |
| 6,832,009 B1 * | 12/2004 | Shezaf et al. | | 382/300 |
| 7,003,173 B2 * | 2/2006 | Deshpande | | 382/261 |
| 7,035,475 B1 * | 4/2006 | Chen et al. | | 382/254 |
| 7,251,361 B2 * | 7/2007 | Gruzdev et al. | | 382/167 |
| 2002/0012476 A1 | 1/2002 | Dillen et al. | | 382/274 |
| 2002/0015111 A1 | 2/2002 | Harada | | 348/642 |
| 2002/0054219 A1 | 5/2002 | Jaspers | | 348/222 |
| 2002/0063789 A1 | 5/2002 | Acharya et al. | | 348/273 |
| 2004/0240725 A1 * | 12/2004 | Xu et al. | | 382/154 |
| 2005/0041842 A1 * | 2/2005 | Frakes et al. | | 382/128 |
| 2005/0135699 A1 * | 6/2005 | Anderson | | 382/261 |

FOREIGN PATENT DOCUMENTS

| | | |
|---|---|---|
| EP | 0 635 973 A1 | 1/1995 |
| EP | 1 178 676 A1 | 2/2002 |
| GB | 2 364 461 | 1/2002 |
| WO | WO 97/34424 | 9/1997 |

* cited by examiner

*Primary Examiner*—Amir Alavi
(74) *Attorney, Agent, or Firm*—Fisher Technology Law PLLC

(57) ABSTRACT

A method of adaptive pixel correction of a multi-color matrix from a sensor includes collecting pixel values, generating plural vectors, normalizing values and determining an estimated value. The collecting pixel values collects values of a two-dimensional multi-pixel kernel around a particular pixel from the multi-color matrix. The generating plural vectors generates vectors from the kernel where each vector has the particular pixel as a central element. The normalizing values normalizes values for nearest neighbor elements to the central element for each vector. The determining an estimated value determines the value based on the normalized values.

31 Claims, 6 Drawing Sheets

METHOD AND APPARATUS FOR ADAPTIVE PIXEL CORRECTION OF MULTI-COLOR MATRIX

BACKGROUND OF THE INVENTION

The priority benefit of the Oct. 10, 2002 filing dates of U.S. provisional patent applications Ser. Nos. 60/417,152 and 60/417,142 are hereby claimed.

FIELD OF THE INVENTION

The present invention relates to a method and apparatus for adaptive pixel defect correction in a multi-color matrix based sensor arrangement through the assessing of edge continuity, a computer program and a computer program for controlling such method in a computer, and an image sensing facility encompassing such apparatus. In particular, the present invention relates to a method for adaptive pixel defect correction in a multi-color matrix-based sensor arrangement that assesses pixel values of a two-dimensional multi-pixel kernel around a particular pixel when determining an apparent defect value of said particular pixel.

DESCRIPTION OF RELATED ART

Multi-color and matrix-based sensor arrangements are coming into rapidly expanding use, where the matrix size expressed in the number of pixels is increasing more or less exponentially in time, and the pixel size is generally decreasing likewise. The probability that a particular pixel will be defective is decreasing as well, but not at the same high rate, so that the overall probability for a matrix to have a defective pixel is on the rise. In many cases, such is commercially unacceptable, so there exists a growing need to provide for an algorithmic procedure that will correct as much as possible the effect of such defective pixels, while requiring only minimal memory facilities and power consumption, needing to access only a small number of image lines/columns at a time, and being applicable to various different defect categories whilst being independent of other DSP (=Digital Signal Processing)-based algorithms, such as those for removing false colors, overall influencing of hue or luminance, or others. The fields of application of such CCD (=Charged Coupled Device), CMOS (=Complementary Metal Oxide Semiconductor), and similarly organized sensors are digital still cameras, digital cinematography, video cameras, scientific imaging, broadcast cameras, surveillance, security monitoring, and various others.

By itself, United States Patent Publication 2002/0015111 to Harada and published on Feb. 7, 2002 discloses an image processing apparatus and associated method. In contradistinction with the present invention, Harada uses a two-dimensional adaptive interpolation wherein a hard decision is made to select the pixels that will be averaged for finding the defective pixel. Moreover, no correlations across different color planes are used, so that the reference is based on a different perceptual model from the present invention.

SUMMARY OF THE INVENTION

In consequence, amongst other things, it is an object of the present invention to introduce the cross-correlation between different color planes as a perceptually-based mechanism for correcting defective pixels.

This an other objects are achieved in a method of adaptive pixel correction of a multi-color matrix from a sensor that includes collecting pixel values, generating plural vectors, normalizing values and determining an estimated value. The collecting pixel values collects values of a two-dimensional multi-pixel kernel around a particular pixel from the multi-color matrix. The generating plural vectors generates vectors from the kernel where each vector has the particular pixel as a central element. The normalizing values normalizes values for nearest neighbor elements to the central element for each vector. The determining an estimated value determines the value based on the normalized values.

This an other objects are also achieved in a system for adaptive pixel correction of a multi-color matrix from a sensor comprising a processor and first, second, third and fourth modules. The first module controls the processor to collect pixel values of a two-dimensional multi-pixel kernel around a particular pixel from the multi-color matrix. The second module controls the processor to generate plural vectors from the kernel where each vector has the particular pixel as a central element. The third module controls the processor to normalizing values for nearest neighbor elements to the central element for each vector. The fourth module controls the processor to determine an estimated value based on the normalized values.

This an other objects are also achieved in a computer readable medium to control a processor for adaptive pixel correction of a multi-color matrix from a sensor. The medium includes first, second, third and fourth modules. The first module controls the processor to collect pixel values of a two-dimensional multi-pixel kernel around a particular pixel from the multi-color matrix. The second module controls the processor to generate plural vectors from the kernel where each vector has the particular pixel as a central element. The third module controls the processor to normalizing values for nearest neighbor elements to the central element for each vector. The fourth module controls the processor to determine an estimated value based on the normalized values.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figures 1, 2:
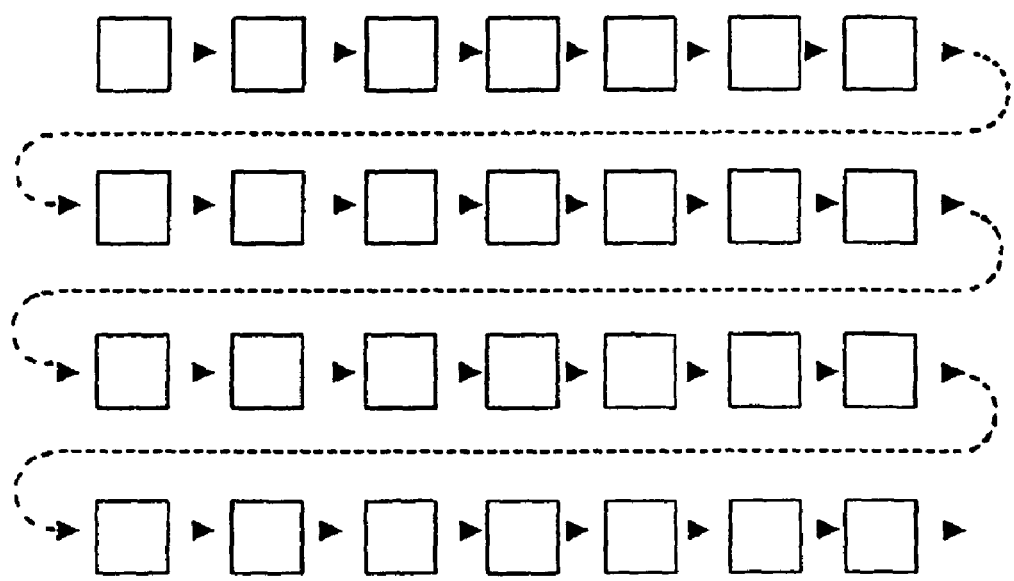
FIG. 1, a Bayer matrix of image points.
FIG. 2, the sequential arrangement of the image points for processing.

A co-pending patent application by the present inventor, titled "Method For Reconstruction Of Pixel Color Values," filed Sep. 10, 2003, Ser. No. 10/658,413, and assigned to the same assignee as the present application, relates to object-based color reconstruction and is incorporated herein by reference. The reconstruction of color pixel values is based on soft decisions in the various color planes, and in particular, by taking into account the spatial response of the human visual system. The results of the present invention may be applied as input to the co-pending application's invention, but such represents no express restriction.

The present invention minimizes perceptual error, utilizes pictorial properties to make intelligent solutions when correcting defective points, and can correct a wide range of shapes and sizes of a defect. Such defects may have the form of single pixels or small clusters. For situations as CCD, the defects may include a whole column or a relatively substantial part thereof. These defects have relatively high spatial frequencies and will often be prominently visible to a user or observer and therefore be unacceptable.

The present invention is, inter alia, based on recognizing the perceptual relevance of a user's expectation that edges which are present in the sensed image will generally be continuous, and that disturbance or interruption of such edges will often be due to disturbances of the sensor per se.

The property of pictorial image R-G-B correlation can be demonstrated by taking the gradient of each R, G, B image component and by analyzing where the gradients differ. In an input image $a[m,n,\lambda]$ that is a function of spatial m (horizontal), n (vertical) and R-G-B components ($\lambda$), the overall gradient may be defined as $$\nabla a = m\partial a/\partial x \vec{O} + n\partial a/\partial y + \lambda \partial a/\partial z.$$

where m, n and $\lambda$ are unit vectors.

In a given pictorial image, it generally holds that the R-G-B values are correlated within objects and along edges. This means that the rates of change of R, G, and B are substantially constant for a point in regions with low spatial frequency and also substantially constant along the edge direction in regions with high spatial frequency. Now ideally, one would like to find the edge direction and utilize the two neighboring pixels in that direction to estimate the defect pixel $a[m0,n0]$. However, in a Bayer matrix arrangement each non-Green pixel is exclusively surrounded by pixels of different colors. For Green pixels, four diagonal neighbors are Green indeed, but the other four neighbors are still non-Green. However, the R-G-B colors of an image are locally correlated to each other even across the color differences. Therefore, although neighboring pixels may sample different colors, according to the invention they are still correlated to the defect pixel's color plane.

The cross-color approach represents a particularly advantageous refinement. The above is exploited by calculating the gradient of the non-defect color plane on each side for each edge direction and by applying this gradient to the nearest known pixel of the same color as the defect on each side of the defect for each edge direction. We then correlate the nearest pixels to the defect pixel's color and acquire the nearest known data. Finally, we may select the edge direction by merely determining which two neighboring pixels of a given edge direction have the least difference in magnitude, once correlated to the defect pixel's color. In a relatively simplistic implementation, the defect value may be calculated as the arithmetic mean of those two pixels. However, a fuller realization of the invention entails to calculate the weighted sum of all neighboring pixels with their weights based on their alignment with the true edge direction.

In an embodiment of the invention, a method exploits this cross-color approach to interpolating a defective pixel. The invention also relates to a computer program having program instructions for controlling a computer to implement a method that exploits this cross-color approach to interpolating a defective pixel, and to such computer program realized as a computer readable medium represented within a tangible read-only computer memory medium or being carried by an electrical signal. The invention also relates to an apparatus arranged for implementing a method that exploits this cross-color approach to interpolating a defective pixel and to an image sensing facility comprising such an apparatus. Further advantageous aspects of the invention are discussed herein.

FIG. 1 illustrates a Bayer matrix of image points for use with the present invention. Alternatively, other arrangements could be used, such as through using subtractive colors, such as cyan, magenta, and yellow, or through various other published embodiments. As shown, the matrix has Green pixels arranged according to a chessboard organization. The remaining pixels have been used for Red pixels in odd rows and Blue pixels in even rows. The dashed square for example corresponds with a Blue pixel FIG. 2 illustrates the sequential arrangement of the image points for processing. Along a row, they are presented in sequence, followed by the next row presented in the same sequential order. It would be clear from this Figure, as to how the pixels pertaining to a particular kernel shape would be organized for use in the processing hereinafter.

Hereinafter, the principles of the preferred embodiment will be discussed. The sampled input image $a[m,n]$ of M columns and N rows in total lets each image point in sequence be tested against the defect map. Finding a defect will initiate the correction thereof. The defect proper will often be signaled by a defect map detection or a defect detection apparatus. Such is state of the art.

Subsequently to the finding of a defect map, the algorithm of adaptive pixel correction of a multi-color matrix from a sensor includes the following.

Pixel values from the multi-color matrix $a[m,n]$ are input to the algorithm column by column within a row and then advancing one row after the last column is input, and the column by column input for the row is repeated (see FIG. 2). In the example discussed herein, 7 rows are buffered locally in order to process a 7×7 matrix kernel. A particular pixel, designated to be at $m_0$, $n_0$, is a pixel 4 columns behind and 4 rows behind the current pixel input. This particular pixel is the pixel under attention. Pixel values of a two-dimensional multi-pixel kernel around the particular pixel are extracted from the multi-color matrix to form a 7×7 matrix kernel with the particular pixel being central to the kernel. The intended color of the central pixel is assessed. The eight nearest neighbor pixels to the particular pixel form parts of four directional "vectors." Each directional vector includes 7 pixels disposed in a straight line that passes through one nearest neighbor pixel, then through the particular pixel, and then through another nearest neighbor pixel.

In the 7×7 matrix kernel, the four directional "vectors" are derived at respective angles that differ by 45°, and which vectors are centered at the particular pixel. The central pixel is under attention, is located at $m_0$, $n_0$ and has a value of $a[m_0, n_0]$. The four vectors have seven elements each, where each element is indexed by nn which may vary over a range from $-3$ to $+3$. The directional four vectors are extracted from the 7×7 matrix kernel so that the vector element index, denoted nn, in each vector is 0 at $m_0$, $n_0$ and the value of all vectors at nn=0 is $$d_i[nn=0]=a[m_0,n_0]$$

for all vectors, i=1 to 4. The four vectors are defined by:

$$d_1[nn=-3 \text{ to } +3]=\{a[m_0,n_{-3}] \ldots a[m_0,n_0] \ldots a[m_0,n_{+3}]\};$$

$$d_2[nn=-3 \text{ to } +3]=\{a[m_{-3},n_3] \ldots a[m_0,n_0] \ldots a[m_{+3},n_{-3}]\};$$

$$d_3[nn=-3 \text{ to } +3] = \{a[m_{-3}, n_0] \ldots a[m_0, n_0] \ldots a[m_{+3}, n_0]\}; \text{ and}$$

$$d_4[nn=-3 \text{ to } +3] = \{a[m_{-3}, n_{-3}] \ldots a[m_0, n_0] \ldots a[m_{+3}, n_{+3}]\}.$$

If the defect map indicates a column is defective at the central image point, the vertical vector in question is thereupon ignored, thus reducing the number of vectors to process from four to three. This generally is only relevant for a CCD sensor.

Next, all active vectors are checked for uncorrected error element. Uncorrected error elements in vectors are elements corresponding to pixels in the multi-color matrix from the sensor that are marked as defective. Because all defects are corrected in a column by column then row by row sequence, defects in pixels that have been processed previously should have been corrected already, but defects in pixels that have yet to be processed may have an uncorrected error. Such uncorrected error pixels in the kernel (elements in the vectors) are in addition to the particular pixel under attention (i.e., the defect point herein) that is located at $m_0$, $n_0$. For example, from the 7×7 matrix kernel surrounding the particular pixel under attention, the vector $d_1[nn=-3 \text{ to } +3]$ is extracted, and this directional vector has values $\{a[m_0, n_{-3}] \ldots a[m_0, n_0] \ldots a[m_0, n_{+3}]\}$. The values of the vector elements for the index range $nn=-3$ to $-1$ have already been processed (see FIG. 2), the value for the vector element for index $nn=0$ is the particular pixel under attention (i.e., the defect point herein), and the values for the vector elements for the index range $nn=+1$ to $+3$ have yet to be determined and could still have uncorrected errors at an index that may vary from $nn_{defect}$ 1 to 3. If a defect exists in one of the vectors (i.e., in addition to a defect at $nn=0$), then the element corresponding to the defect will be interpolated locally within the vector on the same side of the central element (i.e., the same side of $nn=0$). The interpolation depends on the vector to ensure that a step function on one side of the vector will not be averaged into the other side. The vector itself will therefore not be later falsely considered as the edge itself. A vector with an uncorrected error element is processes as follows:

if $nn_{defect} = +3$, $d_i[nn_{defect}] = d_i[nn_{defect} - 2]$, if $nn_{defect} = +1$, $d_i[nn_{defect}] = d_i[nn_{defect} + 2]$, and otherwise, $d_i[nn_{defect}] = d_i[nn_{defect}]$.

In this way the uncorrected error element at $nn_{defect}$ is "filled in" with a value so that a value can be estimated for the particular pixel under attention (i.e., the defect point herein) that is located at $m_0$, $n_0$.

Next, vector elements corresponding to pixels nearest to the pixel under attention at $m_0$, $n_0$ (i.e., the values at $d_i[nn=-1]$ and $d_i[nn=+1]$) are normalized to the color plane of the defect. Normalization is accomplished by calculating the gradient of the non-defect color plane on each side of $d_i[0]$ and by applying the gradient to the nearest sampled elements $d_i[-2]$ and $d_i[+2]$ of the same color plane as the particular pixel under attention. The procedure is carried out as follows for each vector $d_i$.

The gradients of the non-defect color plane on either side of the particular pixel are calculated for each vector according to:

$$\nabla_i[-1] = \{d_i[-1] - d_i[-3]\}/2, \text{ and}$$

$$\nabla_i[+1] = \{d_i[+1] - d_i[+3]\}/2.$$

where $\nabla_i[-1]$ and $\nabla_i[+1]$ are the single-sided single-color gradients on the minus and plus side of the particular pixel under attention, respectively.

Then theses gradients from the non-defect color plane are correlated to the pixels in the defect color plane that are nearest to the particular pixel under attention. This is accomplished by defining new vector elements to estimate the nearest sample elements in the defect color plane to the particular pixel under attention. Let the normalized $\delta$ vector elements be given by:

$$\delta_i[-1] = d_i[-2] + \nabla_i[-1], \text{ and}$$

$$\delta_i[+1] = d_i[+2] + \nabla_i[+1].$$

where $\delta_i[-1]$ and $\delta_i[+1]$ are the single-sided normalized vector elements on the minus and plus side of the particular pixel under attention, respectively.

Then, for vectors for which normalized vector elements were found, we substitute the normalized vector elements for the values at $d_i[nn=-1]$ and $d_i[nn=+1]$ in the color plane of the defect as follows:

$$d_i[-1] = \delta_i[-1], \text{ and } d_i[+1] = \delta_i[+1].$$

The nearest sampled elements of the same color plane as the particular pixel under attention are sample measurement found at $d_i[-2]$ and $d_i[+2]$. The single-sided normalized vector elements $\delta_i[-1]$ and $\delta_i[+1]$ are estimates of samples of the same color as the particular pixel under attention that could have been made at $d_i[nn=-1]$ and $d_i[nn=+1]$ if such sample measurements were made. In this way, the values of the directional vector elements from $d_i[-2]$ to $d_i[+2]$, omitting only $d_i[0]$, have been either sampled or estimated, and the vectors can next be used to determine an edge vector.

Figure 3A:
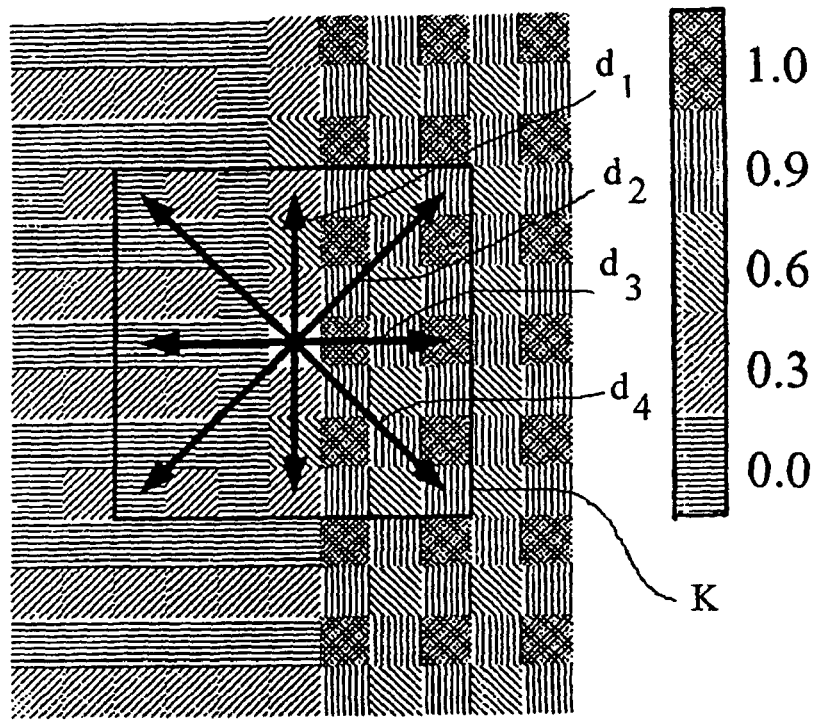
FIGS. 3a-3c, the pixel-based algorithm processing steps.
Figure 3B:
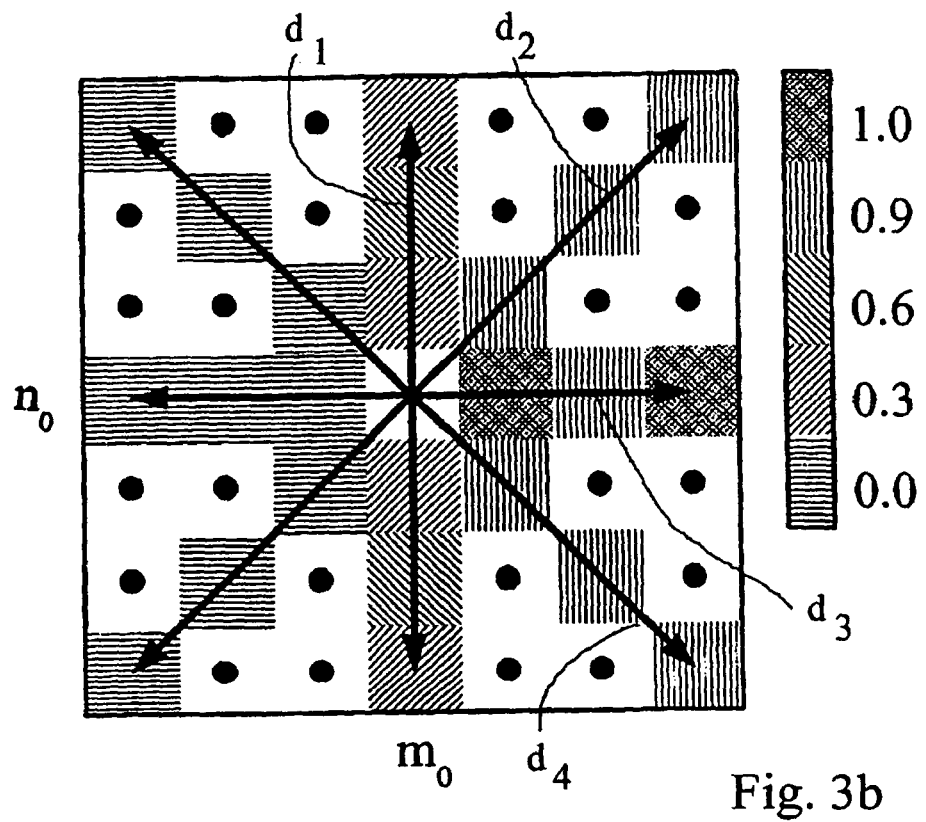
Figure 3C:
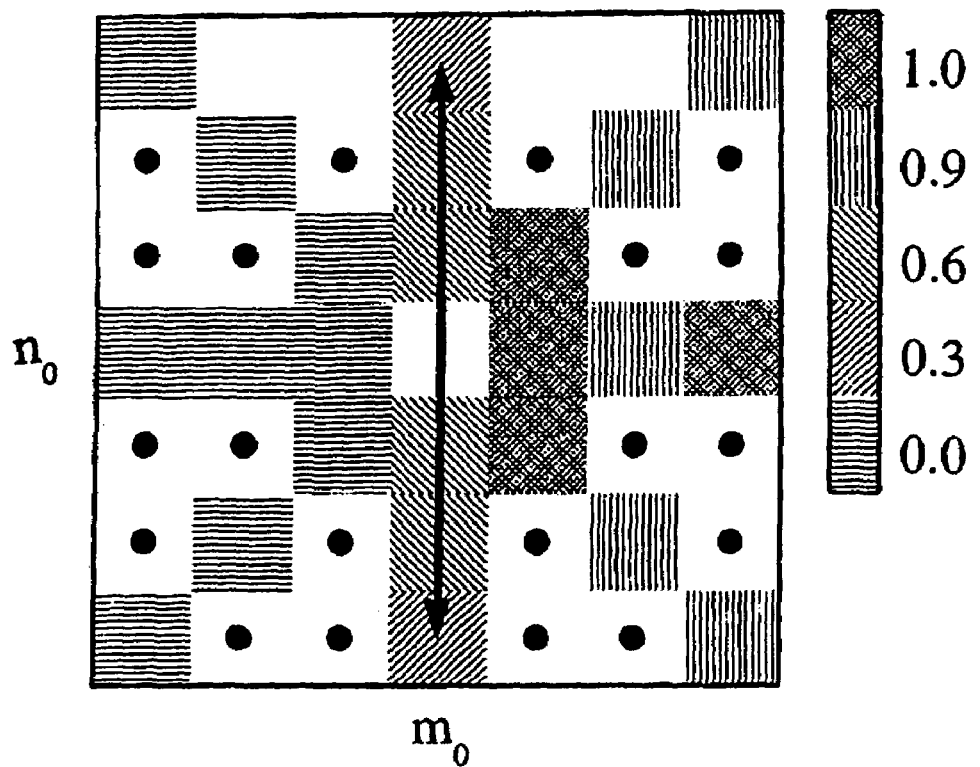

The procedure of normalizing the non-defect color plane pixels has been illustrated in FIGS. 3a through 3c.

Now, we determine an edge-biased weight $X_i$ that uses the distance between $nn=+1$ and $nn=-1$. A distance value for each vector is determined to be $$\delta_i = \text{abs val}\{d_i[-1] - d_i[+1]\}.$$

Then, a measure of an alignment of direction vector i to an edge at $a[m_0, n_0]$ is given by:

$$X_i = \{1 - \delta_i^k/(\Sigma_j \delta_j^k)\}/(I-1)$$

where j is an index over all vectors and I is determined by the number of other vectors other than the current vector i under consideration. For example, when there are four vectors numbered 1 through 4 and the current vector under consideration is i equals 2, then I is 3 (i.e., 4 minus 1).

Herein, the parameter k can be adjusted to modify the algorithm's sensitivity to the differences in $d_i[nn]$, where the sensitivity increases with the value of the exponent k. The vector aligned closest to the edge direction (i.e., the minimum value of the absolute difference) would have the maximum value of $X_i$. Let this edge vector be symbolized by $d_{i \rightarrow}[nn]$. In FIG. 3c, this step of finding a weighted measure for the edge direction is indicated by the arrow.

Finally, the particular pixel under attention $a[m_0, n_0]$ is estimated using the weight factors $X_i$ to yield the estimation:

$$\hat{a} = \Sigma_i X_i \{(d_i[-1] + d_i[+1])/2\}.$$

FIGS. 3a-3c illustrate the various pixel-based algorithm processing steps for normalizing. The bar at the right side of the figures relates the various hatching patterns of the kernel pixels to a numerical value of the color value which is shown at the right side of the bar. FIG. 3a is a Bayer image with its associated edge vectors $d_1$, $d_2$, $d_3$ and $d_4$ in a 7×7 pixel kernel K. A single defect at a[$m_0$, $n_0$] has been indicated by a white pixel. In FIG. 3b, the vector pixels near the defect have been shown in an enlarged manner; the ones marked with a black dot will not be considered for the defect pixel. In FIG. 3c, the neighboring pixels have been normalized to the color plane of the defective pixel. The edge direction is evidently vertical and shown in the figure as an arrow, thereby allowing the interpolating of the defective point.

Figure 4:
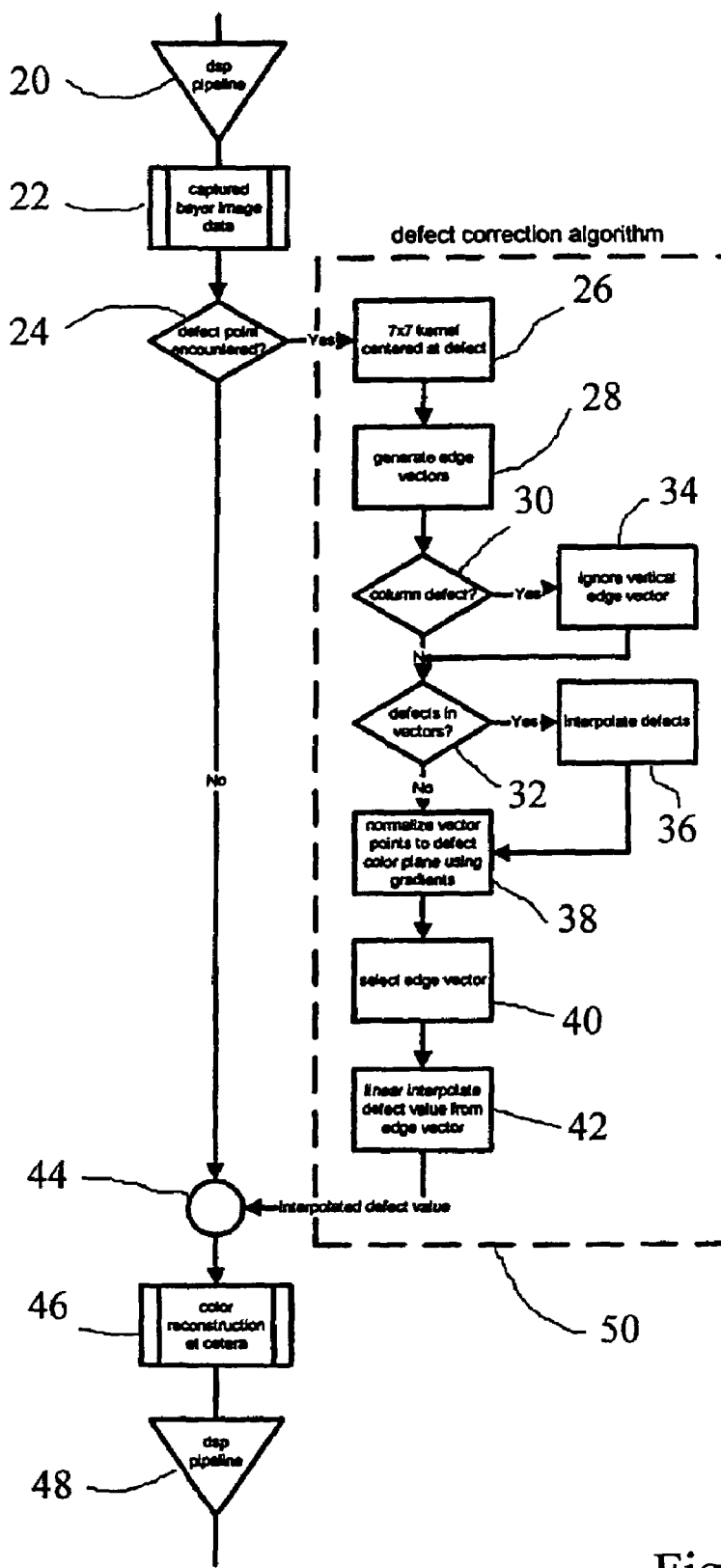
FIG. 4, a flow diagram of a preferred algorithm.

FIG. 4 illustrates a flow diagram of a preferred algorithm. Here, only the operations proper are depicted; commands, handshakes, synchronization and other infrastructure items have been considered standard. Now, element 20 is the DSP pipeline of the arrangement which is fed by an image sensor not shown and which comprises an appropriate amount of processing and memory facilities. Now, the DSP pipeline presents an appropriate amount of information for being processed according to the present invention. Block 22 represents the captured Bayer image data, inasfar as presently used. In block 24, the Bayer image data are checked for occurrence of a defect point. If yes, the system goes to the defect correction algorithm in block 50. First, in block 26 the data of a 7×7 kernel centered at the defect are constituted. In block 28, the four angle vectors thereof are produced. In block 30, these are checked for existence of a column defect. If yes, in block 34, the vertical vector is dropped from further consideration. Next, in block 32, the remaining vectors are checked for defects. If present, in block 36 these defects are interpolated. Then, either from block 32, or from block 36, in block 38 the vector points are normalized to the defect color plane through using gradients. Next, in block 40 a single angular vector is selected, followed in block 42 by linear interpolating the defect from the angular vector. Thereupon, block 50 is left with an interpolated defect value, that in mixer or accumulator facility 44 is combined with the information pertaining to all those situations where no defect point was encountered (block 24). This terminates the present algorithm. In block 46, other color reconstruction steps and various further processing may be effected. Finally, the processed information returns to the DSP pipeline in block 48.

Up to now, no relation has been considered between the defect's value and the actual scene. The inventor has however recognized that it is possible to check the quality of the estimations. In fact, the algorithm is evaluated on the basis of the human visual system and the Nyquist theorem. Often, a defect value will be acceptable in high-frequency regions because the visual system's differentiation ability changes with spatial frequency. Now, the above defect correction algorithm attempts to estimate a defective pixel. According to Nyquist, the highest non-aliased frequency (the Nyquist frequency $f_N$) that the Red, Green, and Blue pixels may sample is equal to half the maximum frequency they may record in a particular direction. The highest recordable unalised frequency is at a minimum $V_2$ of a cycle per pixel (i.e., the full period is 2 pixels long) in a given sample color plane. In a Bayer pattern, red for example, is sampled every two pixels, and the Nyquist frequency would be ¼ of a cycle per pixel (i.e., the full period is 4 pixels long). Moreover, the occurrence of a defective pixel will further lower the Nyquist frequency by half such that the maximum recordable non-aliased frequency would be ⅛ cycle per pixel (i.e., a full period is 8 pixels long).

Now, we start by assuming that the CFA (i.e., color filter array) has a minimum sampling rate of ¼ cycle per pixel (i.e., the full period is 4 pixels long). The correlation is done through using gradients measured at a two-pixel spacing and so could result in a zero gradient through aliasing: then it would be impossible to correlate the non-defect colors. This could lead to a 100% deviation error. On the other hand, if the defect pixel itself deviates only by 10%, using it uncorrected would have been better. Therefore, the typical magnitude of a pixel's defect may be used to decide whether the corrected or rather the uncorrected value of the pixel is a better approximation.

When spatial image frequencies surpass the Nyquist frequency, the correction could be unacceptable. In fact, in such high frequency regions many errors would be perceptually acceptably anyway. On the other hand, in regions with low spatial frequency the requirements set by a user are quite a lot higher; but advantageously, in such a case, the algorithm is much less prone to aliasing. Therefore, if the calculated error is greater than the a predetermined error, it would be better to only correct for the latter.

Figure 5:
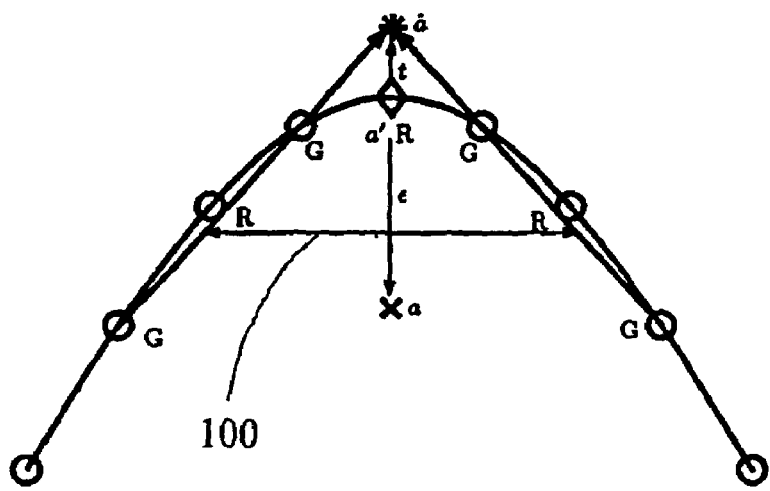
FIG. 5, a diagram showing the reason for $\underline{t}$ aliasing tolerance in the correction error test.

FIG. 5 is a diagram showing the reason for aliasing tolerance value t in the correction error test. In the figure, the pixels have been shown with their matrix colors Red R and Green G, respectively, and their actual values in the vertical direction. The sampled value a for the defect pixel is shown by a large "X". As shown, the horizontal arrow 100 has a span of four pixel distances. If the limit for the distance from the sampled value a for the defect pixel to the correction algorithm's estimate â is restricted to the maximum defect deviation ε, the estimate a would be rejected in favor of keeping the sampled value a. Nevertheless, the estimate â is closer to the true but unknown value a' in this example due to the apex (high frequency content). Therefore, the tolerance value t, which is a function of the local Nyquist frequency, should be added to the maximum defect deviation ε to ensure that defect corrections at apex locations will not be rejected when they would, in effect, be acceptable.

FIG. 6 illustrates the creation of limits for the error correction test. The test is constructed as follows. Let the sampled value for the defective pixel be a and the true but unknown scene value for the defective pixel be a' in an image with an available dynamic range C (e.g., such as 255 for an 8-bit image). The algorithm would then produce an estimate â. In a test, the maximally possible normalized deviation (normalized to the dynamic range) for a sampled value from a given defective pixel may have been found, and defined as $$\epsilon = \text{abs val}\{a_{max} - a'\}/C$$

where $a_{max}$ is the maximum possible deviation that the defective pixel is capable of.

Rejecting all larger deviations (i.e., larger than εC) would discard solutions where the error is less than the error in the value of a(m, n) for certain frequencies. However, in a single-defect case, the Nyquist frequency is ⅛ cycle per pixel. In FIG. 3, a Red pixel is defective, so that the Red pixels are locally sampled only every four pixels. The maximum recordable frequency is ¼ cycle per pixel, and the Nyquist frequency $f_N$ is ½ of that. Since the adaptive edge algorithm uses gradients to calculate an estimate of the pixel value for the defect pixel, the maximum non-aliased signal would be ⅛. When the defect pixel occurs at a local maximum such as in FIG. 5, the correction will over-estimate the value for the defect pixel, although it can never exceed C/16.

Although the error would not exceed $f_N C$, no system will have a perfect Modulation Transfer Function MTF in practice. The MTF may be either theoretically computed or actually measured. The formal aliasing tolerance value t may therefore be given by $t = f_N \cdot MTF(f_N)$. This tolerance value t is added to the maximum defect deviation value ε. Since the aliasing tolerance value t is a function of the local Nyquist frequency times the MTF at that frequency, the combined maximum defect deviation value and aliasing tolerance value is also a function of the local Nyquist frequency. The formal definition of the correction test may be expressed as follows:

if abs val$\{\hat{a}-a\} \leq (\epsilon C+tC)$ then, $a[m_0,n_0]=\hat{a}$, otherwise, $a[m_0,n_0]=a$.

Figure 6A:
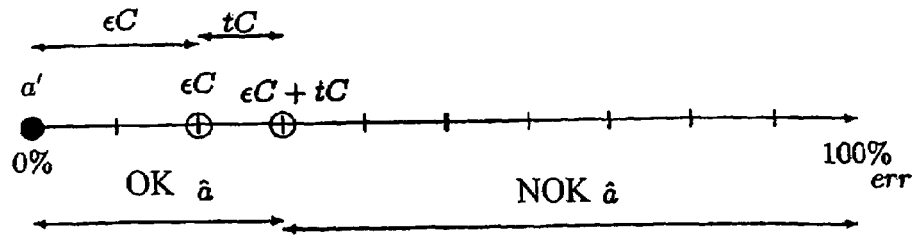
FIGS. 6a, 6b, the creation of limits for the error correction test.
Figure 6B:
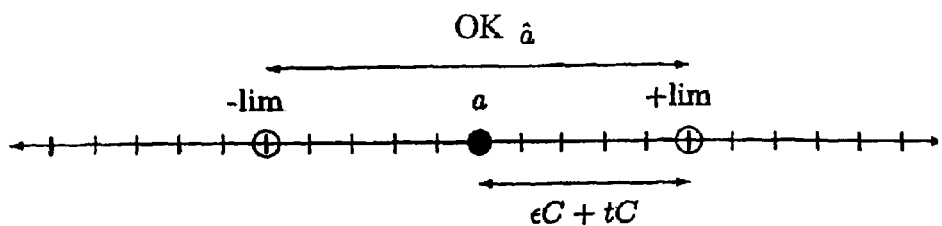

FIGS. 6a and 6b illustrate the creation of limits for the error correction test. FIG. 6a illustrates the developing of an acceptance range OK for the estimated value â for a sampled value a of a defect pixel that differs from the true scene value a' by $\epsilon$ with an aliasing tolerance of t and a scene dynamic range of C. As shown, the estimated value is accepted (OK) if the difference with the scene value a' lies between 0 and $\epsilon C$, and the estimated value is also accepted (OK) even though the difference is greater than $\epsilon C$, but only if it is greater by no more than the aliasing tolerance tC. However, if the error is still greater than the sum of the maximum defect tolerance $\epsilon C$ and the aliasing tolerance tC, up to possibly 100%, the estimated value â is rejected (NOK).

FIG. 6b illustrates the range of values for the estimated value â, centered about the sampled value a, that can be accepted (OK). Any estimated value â found to deviate from the measured sample value a for a defect pixel by less than the maximum defect tolerance $\epsilon C$ added to the aliasing tolerance tC, can be accepted (OK) as a best estimate for the actual unknown scene value a'. As shown, the limit lim can be bidirectional and symmetric, provided of course, that the eventual outcome will not be negative.

Figure 7A:
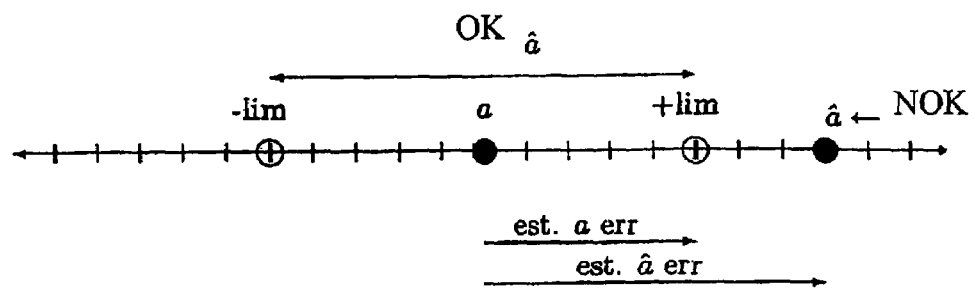
FIGS. 7a, 7b, examples of the error correction test.
Figure 7B:
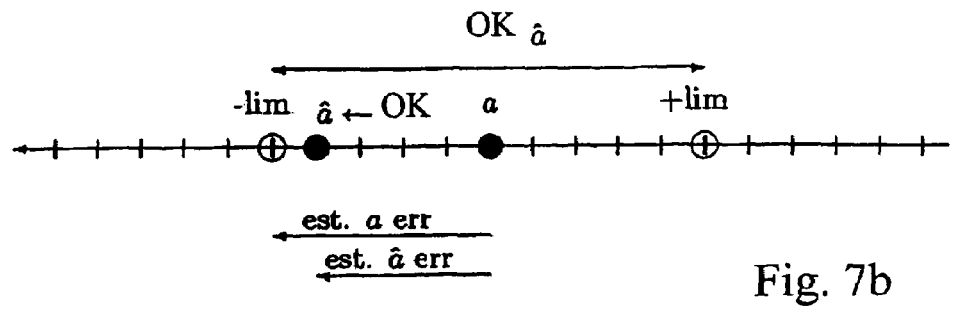

FIGS. 7a and 7b illustrate the use of the error correction test for two different estimates of a defective pixel. FIG. 7a is an example where estimated value â has an error greater than (>) a (see est. â err). Therefore, the correction error test rejects â and uses a instead to estimate the actual scene value a'. The allowable limits have been indicated +/−lim, and the acceptability by OK and NOK, respectively. At the bottom of FIG. 7a, the estimated errors err have been indicated. In contradistinction, FIG. 7b is an example where â is estimated to have an error smaller than (<) a. Therefore, the correction error test accepts â for use as an estimate of the actual scene value a'.

Figure 8:
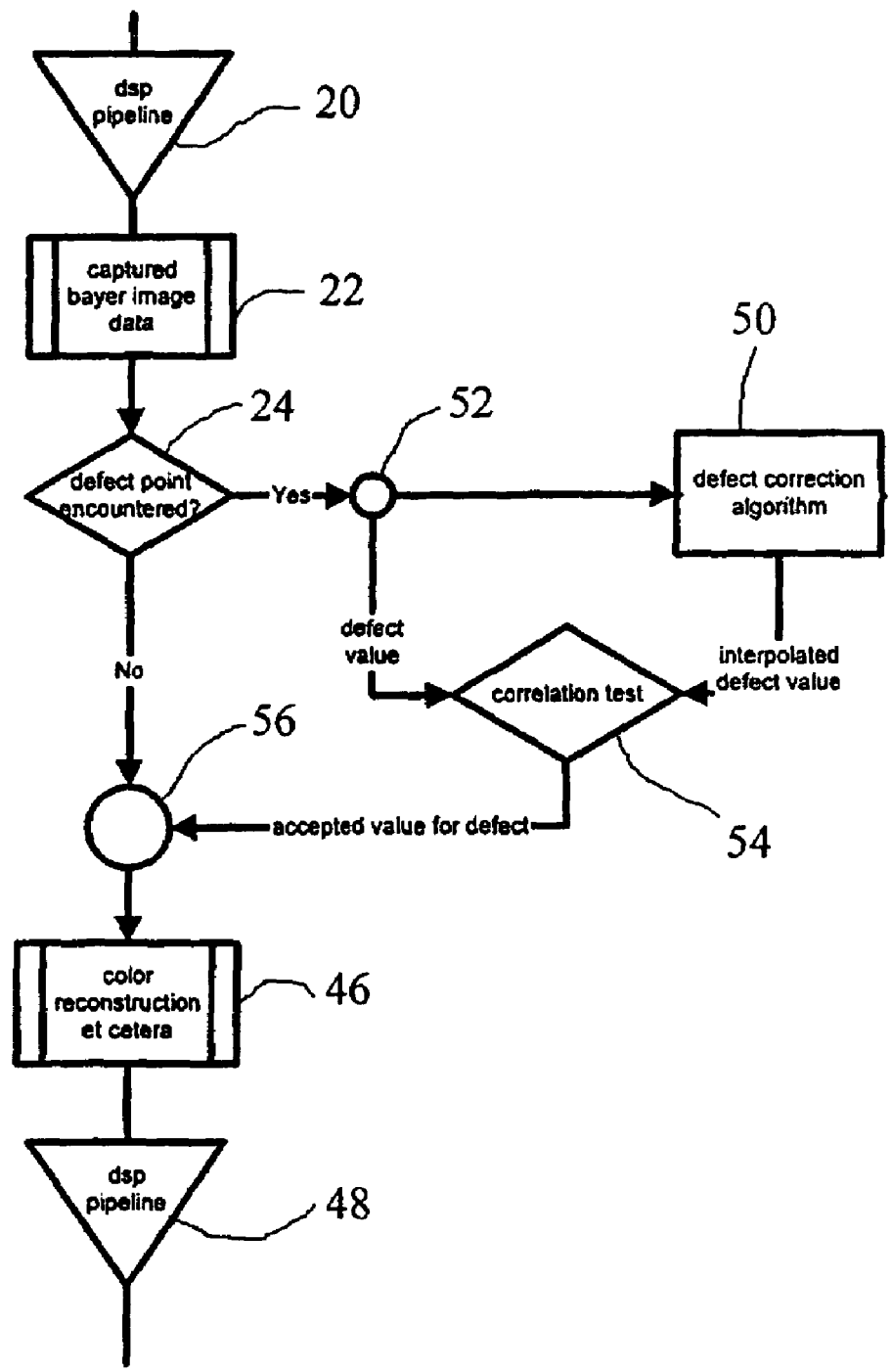
FIG. 8, a flow diagram of a DSP pipeline with error correction test.

FIG. 8 illustrates a flow diagram of a DSP pipeline provided with an error correction test. Much of FIG. 8 corresponds to earlier FIG. 4. In particular, elements 20-24 and 46-50 correspond to the same numbered elements in FIG. 4 and will not be discussed further. However, in block 52 a sampled value a of a defect pixel is retrieve from the captured image and provided to both the defect correction algorithm in block 50 (as discussed with respect to FIG. 4) and to the correlation test in block 54. The defect correction algorithm in block 50 provides an interpolated defect value as an estimated value â to the correlation test in block 54. Block 54 execute a correlation test on the two received quantities as discussed above with respect to FIGS. 6a, 6b, 7a and 7b. If the interpolated defect value â is accepted, it is forwarded to mixer or accumulator block 56 that generally corresponds to block 44 in FIG. 4. If the interpolated defect value â is not accepted, however, block 56 operates as if the original value a was good, or good enough, so that the measured value a is taken as being the best one available.

Having described preferred embodiments of a novel method and apparatus for adaptive pixel correction of a multi-color matrix from a sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method of adaptive pixel correction of a multi-color matrix from a sensor comprising:
    collecting pixel values of a two-dimensional multi-pixel kernel around a particular pixel from the multi-color matrix;
    generating plural vectors from the kernel, each vector having the particular pixel as a central element;
    normalizing values for nearest neighbor elements to the central element for each vector; and
    determining an estimated value for the particular pixel based on the normalized values.

2. The method of claim 1, wherein the determining includes:
    assessing an edge direction at the particular pixel from the normalized values; and
    interpolating the estimated value for the particular pixel based on the normalized value for the edge direction.

3. The method of claim 1, wherein the generating includes disregarding a vertical vector when the corresponding column has been marked as having a column defect.

4. The method of claim 1, further comprising interpolating a value of a vector element corresponding to a defective pixel in the kernel other than the particular pixel.

5. The method of claim 4, wherein the interpolating the value of the vector element includes:
    determining whether the defective pixel exists within the kernel; and
    locally interpolating the value for the vector element in a defective vector such that a step function along one half of the defective vector does not average into an opposite half of the defective vector when the defective pixel exists.

6. The method of claim 1, wherein the plural vectors includes four vectors.

7. The method of claim 1, wherein the multi-color matrix is a Bayer matrix.

8. The method of claim 1, wherein the kernel occupies a square that is symmetrically centered around the particular pixel.

9. The method of claim 8, wherein the kernel includes 7 by 7 pixels.

10. The method of claim 1, wherein the normalizing includes:
    assessing an intended color of the particular pixel;
    finding first and second single-sided single-color gradients for each vector, each gradient being a difference of values from a non-defect color plane along a corresponding vector; and
    combining the single-sided single-color gradient with a value of a corresponding pixel of the intended color of the corresponding vector to define a new value for a nearest neighbor pixel to the particular pixel.

11. The method of claim 1, wherein the determining the estimated value includes:
    assessing an edge direction at the particular pixel from the normalized values by determining an edge biased weight quantity according to $X_1=\{1-\delta_i^k/(\Sigma_i \delta_i^k)\}/(I-1)$, for each vector i wherein $\delta_i$=abs val$\{d_i[-1]-d_i[+1]\}$ and selecting the largest absolute value of $X_i$; and interpolating the estimated value for the particular pixel based on the normalized values for nearest neighbor elements and the edge direction and re-estimating a value for the particular pixel based on the selected edge biased weight quantity.

12. The method of claim 1, further including repeating the method so that the kernel traverses the matrix column by column whilst at the end of each column stepping by one row.

13. The method of claim 1, further including replacing the estimated value of the particular pixel with a sampled value of the particular pixel when the absolute value of a difference between the estimated value and the sampled value is greater than $\epsilon C$, wherein $\epsilon$ is a defined maximum defect deviation and C is an available dynamic range.

14. The method of claim 13, wherein the defined maximum defect deviation $\epsilon$ is determined over a training set of pixels to be $$\epsilon=\text{abs val}\{a_{max}-a'\}/C$$

wherein $a_{max}$ is the maximum possible deviation that the defective pixel is capable of and a' is a true value for the pixel in the training set.

15. The method of claim 1, further including replacing the estimated value of the particular pixel with a sampled value of the particular pixel when the absolute value of a difference between the estimated value and the sampled value is greater than $\epsilon C+tC$, wherein $\epsilon$ is a defined maximum defect deviation, t is a tolerance value dependent on a local Nyquist frequency and C is an available dynamic range.

16. The method of claim 15, wherein the defined maximum defect deviation $\epsilon$ is determined over a training set of pixels to be $$\epsilon=\text{abs val}\{a_{max}-a'\}/C$$

wherein $a_{max}$ is the maximum possible deviation that the defective pixel is capable of and a' is a true value for the pixel in the training set.

17. The method of claim 1, wherein upon non-finding of an edge, a defectiveness of the particular pixel is interpolated without being restricting to a selected edge biased weight quantity.

18. A system for adaptive pixel correction of a multi-color matrix from a sensor comprising:

a processor;

a first module to control the processor to collect pixel values of a two-dimensional multi-pixel kernel around a particular pixel from the multi-color matrix;

a second module to control the processor to generate plural vectors from the kernel, each vector having the particular pixel as a central element;

a third module to control the processor to normalizing values for nearest neighbor elements to the central element for each vector; and a fourth module to control the processor to determine an estimated value based on the normalized values.

19. The system of claim 18, wherein the fourth module includes:

logic to assess an edge direction at the particular pixel from the normalized values; and logic to interpolate an estimated value for the particular pixel based on the normalized value for the edge direction.

20. The system of claim 18, wherein the second module includes logic to disregard a vertical vector when the corresponding column has been marked as having a column defect.

21. The system of claim 18, further comprising a fifth module to interpolate a value of a vector element corresponding to a defective pixel in the kernel other than the particular pixel.

22. The system of claim 21, wherein the fifth module includes:

logic to determine whether the defective pixel exists within the kernel; and logic to locally interpolate the value for the vector element in a defective vector such that a step function along one half of the defective vector does not average into an opposite half of the defective vector when the defective pixel exists.

23. The system of claim 18, wherein the third module includes:

logic to assess an intended color of the particular pixel;

logic to find first and second single-sided single-color gradients for each vector, each gradient being a difference of values from a non-defect color plane along a corresponding vector; and logic to combine the single-sided single-color gradient with a value of a corresponding pixel of the intended color of the corresponding vector to define a new value for a nearest neighbor pixel to the particular pixel.

24. The system of claim 18, wherein the fourth module includes:

logic to assess an edge direction at the particular pixel from the normalized values by determining an edge biased weight quantity according to $$X_i=\{1-\delta_i^k/(\Sigma_i\delta_i^k)\}/(I-1),$$

for each vector i wherein $\delta_i$=abs val$\{d_i[-1]-d_i[+1]\}$ and selecting the largest absolute value of $X_i$; and logic to interpolate the estimated value for the particular pixel based on the normalized values for nearest neighbor elements and the edge direction and re-estimating a value for the particular pixel based on the selected edge biased weight quantity.

25. A computer readable medium to control a processor for adaptive pixel correction of a multi-color matrix from a sensor, the medium comprising:

a first module to control the processor to collect pixel values of a two-dimensional multi-pixel kernel around a particular pixel from the multi-color matrix;

a second module to control the processor to generate plural vectors from the kernel, each vector having the particular pixel as a central element;

a third module to control the processor to normalizing values for nearest neighbor elements to the central element for each vector; and a fourth module to control the processor to determine an estimated value based on the normalized values.

26. The medium of claim 25, wherein the fourth module includes:

logic to assess an edge direction at the particular pixel from the normalized values; and logic to interpolate an estimated value for the particular pixel based on the normalized value for the edge direction.

27. The medium of claim 25, wherein the second module includes logic to disregard a vertical vector when the corresponding column has been marked as having a column defect.

28. The medium of claim 25, further comprising a fifth module to interpolate a value of a vector element corresponding to a defective pixel in the kernel other than the particular pixel.

29. The medium of claim 28, wherein the fifth module includes:
- logic to determine whether the defective pixel exists within the kernel; and
- logic to locally interpolate the value for the vector element in a defective vector such that a step function along one half of the defective vector does not average into an opposite half of the defective vector when the defective pixel exists.

30. The medium of claim 25, wherein the third module includes:
- logic to assess an intended color of the particular pixel;
- logic to find first and second single-sided single-color gradients for each vector, each gradient being a difference of values from a non-defect color plane along a corresponding vector; and
- logic to combine the single-sided single-color gradient with a value of a corresponding pixel of the intended color of the corresponding vector to define a new value for a nearest neighbor pixel to the particular pixel.

31. The medium of claim 25, wherein the fourth module includes:
- logic to assess an edge direction at the particular pixel from the normalized values by determining an edge biased weight quantity according to $$X_i = \{1 - \delta_i^k / (\Sigma_i \delta_i^k)\} / (I-1),$$

for each vector i wherein $\delta_i = \text{abs val}\{d_i[-1] - d_i[+1]\}$ and selecting the largest absolute value of $X_i$; and
- logic to interpolate the estimated value for the particular pixel based on the normalized values for nearest neighbor elements and the edge direction and re-estimating a value for the particular pixel based on the selected edge biased weight quantity.

* * * * *

UNITED STATES PATENT AND TRADEMARK OFFICE
CERTIFICATE OF CORRECTION

PATENT NO.         : 7,477,781 B1
APPLICATION NO.    : 10/658523
DATED              : January 13, 2009
INVENTOR(S)        : Anthony Amir Tanbakuchi It is certified that error appears in the above-identified patent and that said Letters Patent is hereby corrected as shown below:

In line 10 of claim 18 (column 11), change "normalizing" to "normalize".

In line 10 of claim 25 (column 12), change "normalizing" to "normalize".

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO.        : 7,477,781 B1
APPLICATION NO.   : 10/658523
DATED             : January 13, 2009
INVENTOR(S)       : Anthony Amir Tanbakuchi It is certified that error appears in the above-identified patent and that said Letters Patent is hereby corrected as shown below:

Column 11, Claim 18, line 53, change "normalizing" to "normalize".

Column 12, Claim 25, line 49, change "normalizing" to "normalize".

This certificate supersedes the Certificate of Correction issued October 6, 2009.

Signed and Sealed this

Twenty-seventh Day of October, 2009

David J. Kappos
*Director of the United States Patent and Trademark Office*